(12) United States Patent
Umeroglu et al.

(10) Patent No.: US 10,109,321 B2
(45) Date of Patent: Oct. 23, 2018

(54) AUTOMATED QUALITY CONTROL OF MEDIA ASSET

(71) Applicant: COMCAST CABLE COMMUNICATIONS, LLC, Philadelphia, PA (US)

(72) Inventors: Jason B. Umeroglu, Wilmington, DE (US); David Lin, Levittown, PA (US)

(73) Assignee: COMCAST CABLE COMMUNICATIONS, LLC, Philadelphia, PA (US)

( * ) Notice: Subject to any disclaimer, the term of this patent is extended or adjusted under 35 U.S.C. 154(b) by 426 days.

(21) Appl. No.: 14/453,260

(22) Filed: Aug. 6, 2014

(65) Prior Publication Data

US 2015/0029343 A1    Jan. 29, 2015

Related U.S. Application Data

(63) Continuation of application No. 13/524,444, filed on Jun. 15, 2012, now Pat. No. 8,839,326.

(51) Int. Cl.
*G11B 27/36*      (2006.01)
*H04N 9/87*      (2006.01)

(52) U.S. Cl.
CPC ............... *G11B 27/36* (2013.01); *H04N 9/87* (2013.01)

(58) Field of Classification Search
CPC ............ G06K 9/00261; G06K 9/6202; G06T 7/0016; G07D 7/20; G11B 27/36; H04N 9/87

See application file for complete search history.

(56) References Cited

U.S. PATENT DOCUMENTS

| | | |
|---|---|---|
| 7,424,160 B1 | 9/2008 | Basse |
| 8,352,994 B2 | 1/2013 | Pham et al. |
| 8,631,143 B2 * | 1/2014 | Simonds ........ H04N 21/21805 709/225 |
| 8,839,326 B2 | 9/2014 | Umeroglu et al. |
| 2008/0301588 A1 | 12/2008 | Kumar et al. |
| 2009/0060027 A1 | 3/2009 | Ferguson |

* cited by examiner

*Primary Examiner* — Sumaiya A Chowdhury
(74) *Attorney, Agent, or Firm* — Ballard Spahr LLP

(57) ABSTRACT

Some aspects of the disclosure relate to automated quality control of a media asset. The quality control can comprise testing automatically various facets of content reproduction. In one embodiment, three facets can be tested: (1) access to a rendering unit configured to reproduce content of the media asset; (2) rendering of at least a portion of visual content of the media asset; and (3) rendering at least a portion of the aural content of the media asset. In one aspect, testing the rendering of the visual content can be differential in that features of the rendering can be monitored at a plurality of instants during content reproduction and can be compared for two or more instants of the plurality of instants. In another aspect, based on the comparison, the media asset can be deemed to pass the quality control and thus be accepted for consumption.

20 Claims, 8 Drawing Sheets

AUTOMATED QUALITY CONTROL OF MEDIA ASSET

CROSS REFERENCE TO RELATED APPLICATION

This application is a Continuation of U.S. Non-Provisional application Ser. No. 13/524,444 filed Jun. 15, 2012, herein incorporated by reference in its entirety.

BACKGROUND

Streaming video has become a popular form of consuming content on web-based platforms and/or devices. A variety of rendering artifacts can be introduced in such content due to aspects of creation and distribution of web-based video content, some of the rendering artifacts being capable of causing such content to be unusable. For example, a rendering artifact can cause one or more of video content not to playback, video content to freeze at least a portion of a rendered image, video content to lack audio, or the like.

A conventional solution to quality control of video assets includes review of a video asset by human agents prior to acceptance and/or release of the video asset for consumption. Yet, due to the large amounts of content, permitting the human intervention necessary to ensure quality control of video content can incur significant resources, e.g., human, structural and/or financial). In addition, human error generally is unavoidable because of, for example, the highly repetitive nature of such reviewing.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

The disclosure relates, in one aspect, to automated quality control of a media asset. The quality control can comprise testing automatically various facets of content reproduction. In one embodiment, three such facets can be tested: (1) Access to a rendering unit configured to reproduce content of the media asset; (2) rendering of at least a portion of visual content of the media asset; and (3) rendering at least a portion of the aural content of the media asset. In one aspect, testing a rendered portion of the visual content can be differential in that features of the rendering, such as color composition of a plurality of pixels and/or audio output, can be monitored at a plurality of instants or locations during content reproduction and can be compared for various groups (pairs, triplets, etc.) of instants of the plurality of instants. In another aspect, based on the comparison, the media asset can be deemed to pass the quality control and thus be accepted for consumption. It should be appreciated that, in certain scenarios, comparison of rendering of portions of streaming content at certain instants can permit determining if the media content is rendering adequately. For instance, when the result of a comparison between a first rendering occurrence at a first time and a second rendering occurrence at a second time yields no difference, the streaming content that is being rendered at such occurrences is the same or substantially the same. Therefore, the streaming content is likely not rendering adequately (e.g., a "frozen" image is present) because instead of rendering moving pictures, what is rendered is a still or substantially still picture.

Some embodiments of the disclosure provide various advantages when compared to conventional technologies for quality control and/or quality assurance of streaming videos. For example, the disclosure can provide automated quality control of media assets which can mitigate or avoid quality assurance errors arising from human intervention that generally is part of the conventional technologies. As a result, the disclosure can largely reduce customer attrition of a streaming content platform originating from poor quality of provided media assets. For another example, certain embodiments of the disclosure can be integrated to substantially any repository or service platform containing the same for performing quality control of one or more media assets contained in the repository. For yet another example, other embodiments of the disclosure can be portable and thus can permit ad hoc testing of media assets in local repositories in the field or within customer premises.

Additional aspects or advantages of the subject disclosure are set forth in part in the description which follows, and in part will be obvious from the description, or may be learned by practice of the subject disclosure. The advantages of the subject disclosure can be realized and attained by means of the elements and combinations particularly pointed out in the appended claims. It is to be understood that both the foregoing general description and the following detailed description are exemplary and explanatory only and are not restrictive of the disclosure.

BRIEF DESCRIPTION OF THE DRAWINGS

The annexed drawings are an integral part of the subject disclosure and illustrate exemplary embodiments thereof. Together with the description set forth herein and the claims appended hereto, the annexed drawings serve to explain various principles, features, or aspects of the subject disclosure.

FIG. 4 through FIGS. 6A-6B illustrate example methods in accordance with one or more aspects of the disclosure.

DETAILED DESCRIPTION

Figure 1A:
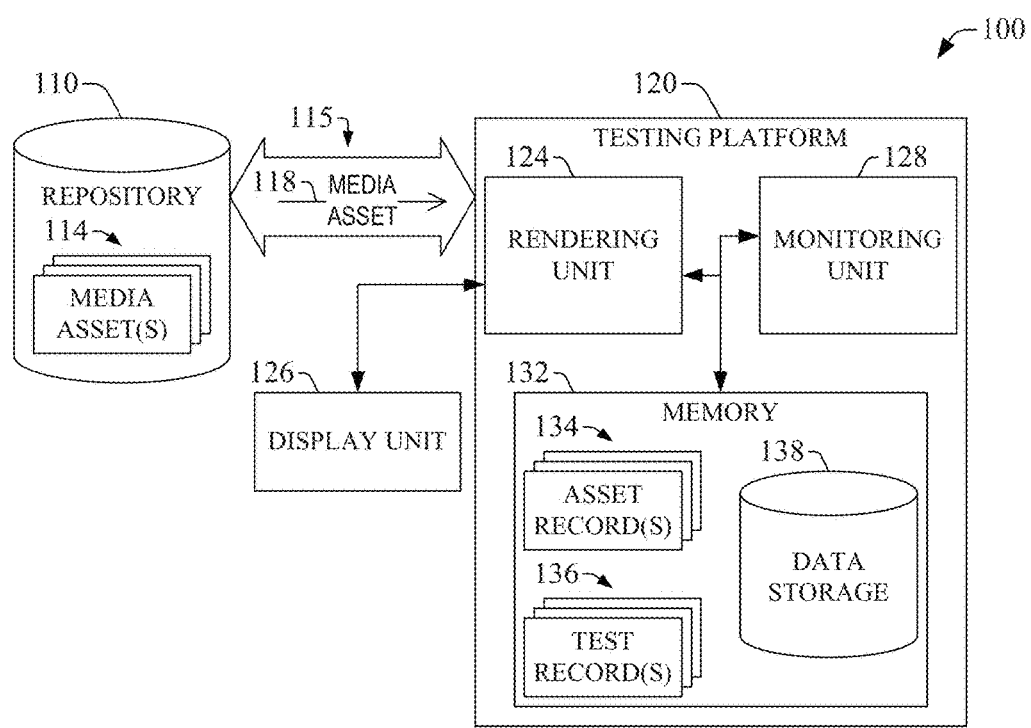
FIGS. 1A-1B illustrate example systems in accordance with one or more aspects of the disclosure.

The various aspects described herein can be understood more readily by reference to the following detailed description of exemplary embodiments of the subject disclosure and to the annexed drawings and their previous and following description.

Before the present systems, articles, apparatuses, and methods are disclosed and described, it is to be understood that the subject disclosure is not limited to specific systems, articles, apparatuses, and methods for automated quality control of media assets. It is also to be understood that the terminology employed herein is for the purpose of describing particular, non-exclusive embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

As utilized in this specification and the annexed drawings, the terms "system," "layer," "component," "unit," "interface," "platform," "node," "function" and the like are intended to include a computer-related entity or an entity related to an operational apparatus with one or more specific functionalities, wherein the computer-related entity or the entity related to the operational apparatus can be either hardware, a combination of hardware and software, software, or software in execution. Such entities also are referred to as "functional elements." As an example, a unit can be, but is not limited to being, a process running on a processor, a processor, an object (metadata object, data object, signaling object), an executable computer program, a thread of execution, a program, a memory (e.g., a hard-disc drive), and/or a computer. As another example, a unit can be an apparatus with specific functionality provided by mechanical parts operated by electric or electronic circuitry which is operated by a software application or a firmware application executed by a processor, wherein the processor can be internal or external to the apparatus and can execute at least a portion of the software application or the firmware application. As yet another example, a unit can be an apparatus that provides specific functionality through electronic functional elements without mechanical parts, the electronic functional elements can include a processor therein to execute software or firmware that provides, at least in part, the functionality of the electronic functional elements. The foregoing examples and related illustrations are but a few examples and are not intended to be limiting. In addition, while such illustrations are presented for a unit, the foregoing examples also apply to a system, a layer, a node, an interface, a function, a component, a platform, and the like. It is noted that in certain embodiments, or in connection with certain aspects or features of such embodiments, the terms "system," "layer," "unit," "component," "interface," "platform" "node," "function" can be utilized interchangeably.

Throughout the description and claims of this specification, the words "comprise," "include," and "having" and their variations, such as "comprising" and "comprises," "include" and "including," "having" and "has," mean "including but not limited to," and are not intended to exclude, for example, other units, nodes, components, functions, interfaces, actions, steps, or the like. "Exemplary" means "an example of" and is not intended to convey an indication of a preferred or ideal embodiment. "Such as" is not used in a restrictive sense, but for explanatory purposes.

Disclosed are components that can be utilized to perform the disclosed methods, devices, and/or systems. These and other components are disclosed herein, and it is understood that when combinations, subsets, interactions, groups, etc. of these components are disclosed that while specific reference of each various individual and collective combinations and permutation(s) of these may not be explicitly disclosed, each is specifically contemplated and described herein, for all methods, devices, and/or systems. This applies to all aspects of the subject disclosure including steps, or actions, in the disclosed method(s). Thus, if there are a variety of additional steps, or actions, that can be performed, then it is understood that each of such additional steps, or actions, can be performed with any specific embodiment or combination of embodiments of the disclosed methods.

As it will be readily appreciated, in one aspect, the methods, devices, and/or systems of the disclosure can take the form of an entirely hardware embodiment, an entirely software embodiment, or an embodiment combining software and hardware aspects. In an additional or alternative aspect, the methods, devices, and/or systems can take the form of a computer program product on a computer-readable storage medium having computer-readable program instructions (e.g., computer software) embodied in the storage medium. More particularly, the disclosed methods, devices, and/or systems can take the form of web-implemented computer software. Any suitable computer-readable storage medium can be utilized including hard disks, CD-ROMs, optical storage devices, or magnetic storage devices.

Embodiments of the methods and systems are described below with reference to block diagrams and flowchart and/or call-flow illustrations of methods, systems, apparatuses and computer program products. It will be understood that each block of the block diagrams and flowchart illustrations, and combinations of blocks in the block diagrams and flowchart illustrations, respectively, can be implemented by computer program instructions. Such computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions also can be loaded onto a computer or other programmable data processing apparatus to cause a series of operational steps, or acts, to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It also will be understood that each block of the block diagrams and flowchart illustrations, and combinations of blocks in the block diagrams and flowchart illustrations, can be implemented by special purpose hardware-based computer systems that can perform the specified functions or steps, or combinations of special purpose hardware and computer instructions.

Reference will now be made in detail to the various embodiments and related aspects of the subject disclosure, examples of which are illustrated in the accompanying drawings and their previous and following descriptions. Wherever possible, the same reference numbers are used throughout the drawings to refer to the same or like parts.

The disclosure identifies and addresses, in one aspect, the issue of quality control and quality assurance of media assets, such as streaming videos. It should be appreciated that as media assets become more pervasive, being more readily available on a variety of platforms and/or devices, quality control becomes increasingly difficult to implement. In one aspect, the disclosure relates to automated quality control of a media asset. Such quality control can comprise testing automatically various facets of content reproduction (e.g., playback) of the media asset. In one embodiment in which the media asset conveys a motion picture with audio, the quality control can include, for example, testing three facets of content reproduction: (1) access to a rendering unit configured to reproduce the media asset; (2) rendering of at least a portion of visual content (e.g., the motion picture) of the media asset; and (3) rendering at least a portion of the aural content (e.g., audio of the motion picture) conveyed by the media asset. In one aspect, testing the rendering of images of the media asset can be differential in that features of the rendering can be monitored at a plurality of instants during content reproduction and compared. Based on comparison of such features the media asset can be deemed to pass the quality control and thus be accepted for consumption at an end-user device. Certain functional elements of the subject disclosure can be implemented (e.g., performed) by software, hardware, or a combination of software and hardware. Functional elements of the various embodiments described in the present specification and illustrated in the annexed drawings can be employed in operational environments (access network, telecommunication network, signaling network, etc.) that can include, for example, digital equipment, analog equipment, or both, wired or wireless equipment, etc.

FIG. 1A is a block diagram of an exemplary system 100 that enables quality control and quality assurance of media assets in accordance with one or more aspects of the disclosure. As described herein, at least certain features of the quality control can be automated. The exemplary system 100 comprises a repository 110 functionally coupled (e.g., communicatively coupled) to a testing platform 120 via a communication link 115 which permits, at least in part, the testing platform 120 to acquire (e.g., retrieve or otherwise receive) a media asset 118 from the repository 110. In addition, the testing platform 120 can be functionally coupled to a display unit 126 via, for example, a rendering unit 124. It should be appreciated that the communication link 115 also can permit exchange of other information (e.g., data or metadata, or a combination thereof) between the testing platform 120 and the repository 110. In one aspect, the testing platform 120 can implement quality control of the media asset 118 by conducting one or more performance checks or evaluations as described herein. Conducting the performance checks can comprise one or more of collecting data and/or metadata indicative of the media asset 118, receiving such data and/or metadata, collecting and analyzing such data and/or metadata, receiving and analyzing such data and/or metadata, or the like. In another aspect, the media asset 118 can be acquired from one or more media assets 114 retained in the repository 110. In one embodiment, the repository 110 can be remotely located with respect to the testing platform 120. For instance the repository can be part of a content distribution network (CDN; not shown). In another embodiment, the repository 110 can be in proximity to or integrated into the testing platform 110. A media asset can comprise one or more of audio, images, or video. In certain scenarios, the media asset can be or can comprise one of a linear-programming asset or a recorded media asset, such as a video-on-demand (VOD) or networked-stored VOD (nVOD).

To enable functional coupling between the testing platform 120 and the repository 110, the communication link 115 can be functionally coupled (e.g., communicatively coupled) to at least one input/output (I/O) interface (not shown) at the testing platform 120 and the repository 110. Communication among the repository 110 and the testing platform 120 or a component thereof can be effected, at least in part, via data and signaling pipe 155. In one aspect, communication among the testing platform 120 and the repository 110 can be effected in accordance with one or more packet-switched protocols, such as Ethernet protocol format; internet protocol (IP) format, such as IPv4 and IPv6, or the like; TCP/IP; user datagram protocol (UDP) format, HTTP, simple object access protocol (SOAP), simple network management protocol (SNMP), or the like.

Figure 1B:
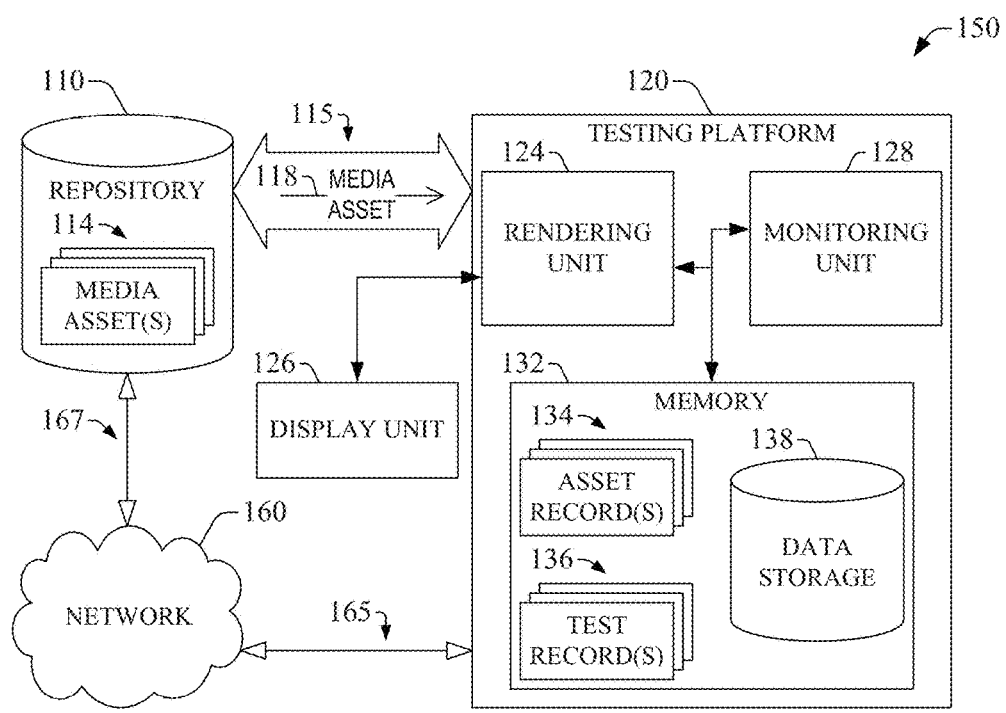

In embodiments, such as example system 150 illustrated in FIG. 1B, in which the repository 110 and the testing platform 120 are distributed in a network 160 (a service network, an enterprise network, an ad hoc network, etc.) or functionally coupled thereto, the communication link 115 can comprise a data and signaling pipe having an upstream link, or uplink (UL), and a downstream link, or downlink (DL). The UL flow of information is represented with an arrow oriented towards the repository 110, whereas the DL flow of information is represented with an arrow oriented towards the testing platform 120. It should be appreciated that the communication link 115 is represented with open-head arrows, to pictorially indicate that one or more network components (router(s), server(s), network switches(s), connector(s), hubs, etc.) can permit communication among the testing platform 120 and the repository 110. The data and signaling pipe can include one or more of: a reference link (Cx, Cr, Dh, Dx, Gm, Ma, Mg, or the like) and related components; conventional bus architectures such as address buses, system buses; wired links, such as high definition multimedia interface (HDMI) cables, fiber optic lines, coaxial lines, hybrid fiber-coaxial links, Ethernet lines, T-carrier lines, twisted-pair line, or the like, and various connectors (e.g., an Ethernet connector, an F connector, a USB connector, an RS-232 connector, or the like); wireless links, including one or more of terrestrial wireless links, satellite-based wireless links, or a combination thereof; and so forth.

As illustrated, in one aspect, the repository 110 and the testing platform 120 can exchange content and signaling with the network 160 via data and signaling pipe 167 and a data and signaling pipe 165, respectively. In one aspect, the pipe 165 and the pipe 167 enable functional coupling that permits such exchange. As indicated herein, the network 160 can be, for example, a service network, and such coupling permits, at least in part, the network 160 to provide a service. In one scenario, the service can comprise testing an item of content according to one or more aspects of the disclosure. Items of content can include media assets (e.g., audio, images, video, or combinations thereof) and related metadata, the media assets comprising linear-programming assets and recorded media assets. Similarly to communication link 115, the data and signaling pipes 165 and 167 can include one or more of wireless links, wire line links, or a combination thereof. In certain implementations, for example, each of the data and signaling pipes 165 and 167 can comprise one or more of: a reference link (Cx, Cr, Dh, Dx, Gm, Ma, Mg, or the like) and related components; conventional bus architectures such as address buses, system buses; wired links, such as fiber optic lines, coaxial lines, hybrid fiber-coaxial links, Ethernet lines, T-carrier lines, twisted-pair line, or the like, and various connectors (e.g., Ethernet connectors, F connectors, RS-232 connectors, or the like); wireless links, including terrestrial wireless links, satellite-based wireless links, or a combination thereof; and so forth.

Communication among the testing platform 120 and the network 160 and/or the repository 110 and the network 160 can be effected in accordance with one or more packet-switched protocols, such as Ethernet protocol format; internet protocol (IP) format, such as IPv4 and IPv6, or the like; TCP/IP; user datagram protocol (UDP) format, HTTP, simple object access protocol (SOAP), simple network management protocol (SNMP), or the like.

In certain embodiments, the network 160 can include wireless networks, wire line networks, or a combination thereof, and can provide a service to one or more devices, such as user equipment, customer premises equipment, control equipment (e.g., signaling units), operation and maintenance (O&M) equipment (e.g., network probes), and the like. In one aspect, the service provided by the network 160 can be a consumer service, such as content communication (media on demand, Internet service, digital telephony (e.g., voice over internet protocol (VoIP)), multimedia message service (MMS), short message service (SMS), etc.); content management (e.g., network digital video recording, messaging administration); emergency services (e.g., enhanced 911); location-based services; or the like. In another aspect, the service provided by the network 160 can be a network administration service, which can comprise one or more of accounting and billing, access control, subscriber provisioning, customer service support (including, for example, interactive voice response (IVR)), performance monitoring (e.g., dashboard services, automation control, etc.), or the like. Architecture of the network 160 can be specific to the provided service.

In one aspect, the network 160 can embody or comprise one or more of a wide area network (WAN), a signaling network (e.g., SS#7), an enterprise network, a local area network, a home area network, a personal area network (which can include wearable devices), or the like. Such networks can operate in accordance with one or more communication protocols for wire line communication or wireless communication. In certain embodiments, the network 160 can have several functional elements that can provide a backbone network, such as a high-capacity packet-switched network. In other embodiments, the network 160 can have internal structure, with several functional elements that can provide at least two main operational blocks: a backbone network (e.g., a high-capacity packet-switched network) and a regional access network (RAN). The internal structure also can include functional elements that provide more spatially localized networks, such as local area networks, home area networks, or the like. Both the backbone network and the regional access network (RAN) can be WANs, for example, with the backbone network having a larger geographical scope than the RAN.

While illustrated as a separate entity from the network 160, it should be appreciated that in the example system 150, the testing platform 120 and/or the repository 110 can be deployed (e.g., installed, configured, tested, and/or accepted) in a network layer (e.g., a business network layer, or a customer service network layer) of the network 160. In addition or in the alternative, the testing platform 120 and/or the repository 110 can be deployed in the core network platform (which can have one or more servers and gateway nodes embodying one or more network layers; not shown). For instance, the testing platform 120 can be embodied in a server within the core network platform (not depicted) and the repository 110 can be embodied in a network repository within or functional coupled to the core network platform. Moreover, or as another alternative, the testing platform 120 can be deployed at a distribution platform, such as a distribution hub or other facility of a service provider that administers the network 160, at the edge of the network 160 and an end user.

In embodiments in which the repository 110 and the testing platform 120 are in proximity or integrated, for example, the communication link 115 can have reduced complexity and can be embodied in or can comprise a wired link or wireless link, or a combination thereof. In one aspect, the wired link can include conventional bus architectures such as address buses, system buses, fiber optic lines, coaxial lines, Ethernet lines, or the like, and various connectors (e.g., an Ethernet connector, an F connector, a universal serial bus (USB) connector, an RS-232 connector, or the like). In another aspect, the wireless link can include terrestrial wireless links, e.g., point-to-point wireless links, line-of-sight (LOS) wireless links, short-range wireless links such as those associated with low-power access points, or a combination thereof.

In view of the description herein, it becomes apparent that the testing platform 120 can be deployed in various locations within a network (e.g., network 160), including backend service network layers, high-level network layers, distribution hubs, customer premises, or the like. In addition, the testing platform 120 can be embodied as ad hoc equipment, having suitable software or firmware, as described herein, that can be transported between network locations for the purpose of automatically testing one or more media assets, wherein the testing platform 120 can leverage the network 160 to access or acquire media assets to be tested. For instance, in one scenario, a field engineer can utilize the testing platform 120 in a distribution hub (not depicted) to test media assets generated locally or remotely to the media hub.

In the exemplary system 100, the testing platform 120 can comprise a rendering unit 124, a monitoring unit 128, and a memory 132. The monitoring unit 128 can acquire the media asset 118 and can retain a record thereof in memory 132 at a memory element (e.g., a register, a memory address, a cache, a memory page, a file, a database, or the like) labeled asset record(s) 134, the memory element having one or more asset records. In one implementation, an asset record can be embodied in or can comprise a uniform resource locator (URL) indicative of a location in repository 110 or a network node functionally coupled thereto that contains a data structure representative of the media asset 118. In one aspect, to acquire the media asset 118, the monitoring unit 128 can query a database containing the one or more media assets 114 in repository 110, or another local or remote database, and, in response, the monitoring unit 128 can receive the media asset 118. The one or more media assets 114 can be media assets that are unapproved (or unaccepted) for consumption by an end-user device.

The monitoring unit 128 can supply the media asset 118 to the rendering unit 124, which can be configured to reproduce, or playback, such asset. In response to reproduction of the media asset 118, the rendering unit 124 can issue (e.g., generate, transmit, generate and transmit, or the like) a playback notification indicating that the media asset is being reproduced. The media asset 118 can be reproduced, in an aspect, at a testing location. In one implementation, the monitoring unit 128 can search for log data indicative of a playback error, wherein the rendering unit 124 can generate playback log information that, in an instance of erroneous playback, can include log data indicative of the playback error. In one aspect, to search for such log data, the monitoring unit 128 can parse through at least a portion of the playback log information. In response to identifying log data indicative of the playback error, the monitoring unit 118 can generate the playback notification. In another implementation, the monitoring unit 128 can access (e.g., poll) or otherwise receive the playback notification and can generate an access notification indicative of the media asset 118 passing an access check based on the rendering unit 124 initiating reproduction, or playback, of such asset. In one aspect, the monitoring unit 128 can retain the access notification as a record of the access check (or test) for the media asset 118. In another aspect, the monitoring unit 128 can create a record indicative of such access check being successful and can retain the record in memory 132 at a memory element labeled test record(s) 134, the memory element having one or more test records. In a scenario in which the playback notification is absent, the monitoring unit 128 can implement exception handling, which can comprise issuing an indication (e.g., a message) of an initialization error for the media asset 118.

In response to accessing or otherwise receiving the playback notification, the monitoring unit 128 can perform an image check for the media asset 118. In one embodiment, the image check can include generation of two or more color compositions of a specific plurality of pixels in two or more frames of the media asset 118, each of the color compositions being specific to each of the frames. In one aspect, a color composition can comprise a plurality of values (real numbers, integer numbers, hexadecimal numbers, etc.) corresponding to a set of one or more color values—e.g., red (R) component value, green (G) component value, and blue (B) component value, or a chrominance (C) value and luminance (Y) value—representing a color for each pixel of the specific plurality of pixels. In one aspect, the monitoring unit 128 can provide (e.g., generate and retain) a data structure representative of the plurality of values in the color composition. The data structure can permit processing (e.g., encoding, compression, up-conversion, down-conversion, or the like) of the color composition data, and, for example, the data structure can be embodied in or can comprise a multi-dimensional array containing such values. In one aspect, the color of each pixel of the specific plurality of pixels is particular to an image or portion thereof associated with a frame of the media asset 118. As an example, the specific plurality of pixels can comprise $N_T$ pixels, each pixel having a set of M values representative of the color of the pixel. Accordingly, a color composition can have $N_T \times M$ values. Here, $N_T$ and M are positive integers. The magnitude of $N_T$ can be configurable and can be determined, for example, as a predetermined percentage of the number of pixels in a rendering medium (a liquid crystal layer, a plasma layer, etc.) that can be included in the display unit 126. In some embodiments $N_T$ can be 17 or 30. The magnitude of M can be established by the color representation utilized to define the color of a pixel: In an RGB representation, M=3, whereas in chroma and luma representation, M=2.

As part of the image check, the monitoring unit 128 can, in another aspect, compare at least one pair (e.g., one pair, two pairs, more than two pairs, or all possible pairs) of color compositions (or data sets indicative thereof) of the two or more color compositions generated for the specific plurality of pixels. In certain implementations, the monitoring unit 128 can compare a first data structure associated with a first color composition and a second data structure associated with a second color composition, the first color composition and the second color composition being included in the two or more color compositions. It should be appreciated that the first color composition and the second color composition can occur at different time instants, or occurrences, in an item of content, such as a media asset. When the result of such comparison yields a difference between at least one pair of data elements in the first and second data structures, the image check indicates that the frames associated with the first and second color compositions convey different images. Thus, the streaming video segment is rendering adequately and the monitoring unit 128 implementing the image check can produce a "Pass" outcome and/or a notification conveying that the video segment rendering is adequate. In contrast, when the result of such comparison yields no difference between the first and second data structures, the image check indicates that the frames associated with the first and second color compositions convey the same or substantially the same image (or portion of an image). Thus, the streaming video segment is likely not rendering adequately (e.g., a "frozen" image is present), and the monitoring unit 128 implementing the image check can produce a "Fail" outcome and/or a notification conveying that the video segment rendering is erroneous.

Figure 2A:
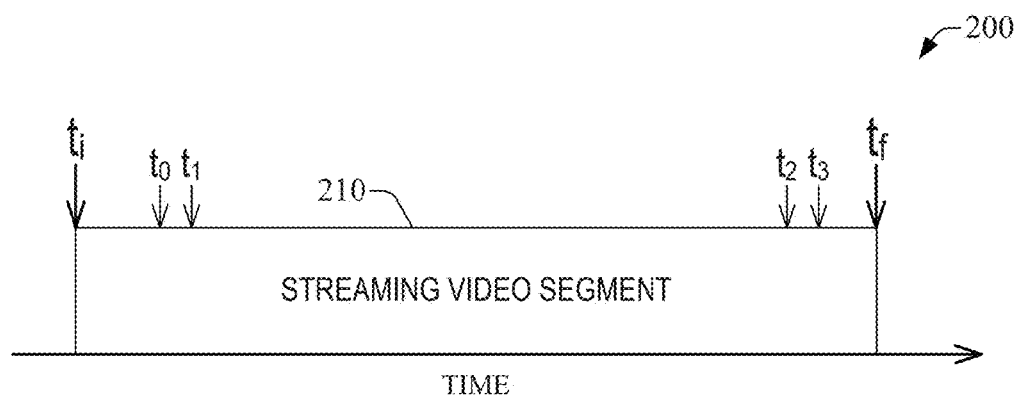
FIGS. 2A-2B depict, respectively, a plurality of test instants in a media asset and an example grid of pixels in accordance with one or more aspects of the disclosure.

In certain implementations, two or more pairs of color compositions, or data indicative thereof, can be generated for respective two or more pairs of frames of the media asset 118 at different instants during the duration (e.g., $\Delta t = t_f - t_i$ in FIG. 2A) of the media asset 118. The monitoring unit 128 can compare each of such pairs of color compositions and, based on the comparison, the monitoring unit 128 can generate "Pass" or "Fail" outcomes. It should be appreciated that generation of such pairs and each of such comparisons can embody an image check.

Figure 2B:
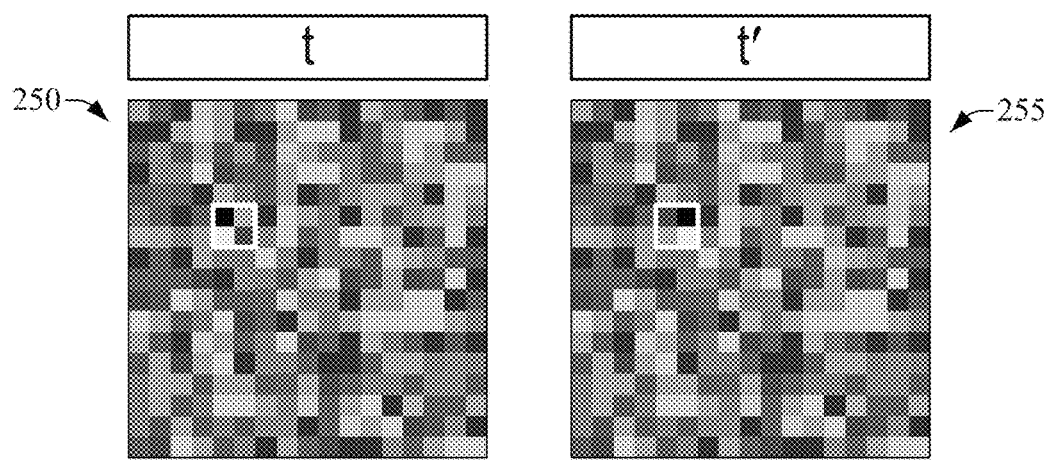

In a scenario in which a media asset 118 that is embodied in or comprises streaming content (e.g., a streaming video segment), each of the two or more frames can pertain to specific instants. As illustrated in diagram 200 in FIG. 2A, the image check can be conducted at two frames at instants $t_0$ and $t_1$, such frames can be utilized to generate respective color compositions for a plurality of pixels. The $N_T$ pixels can be arranged in a grid of $N_x \times N_y$, as exemplified in FIG. 2B in which a grid of 17×17 pixels is pictorially represented for $N_T$=289 pixels. Here, $N_T$, $N_x$, and $N_y$ are positive integers. For such pixel grid, a color composition can be generated for various instants, as exemplified by diagrams 250 and 255, which present, respectively, example color compositions at instants t and t'. In the foregoing scenario, two color compositions can be generated: A first color composition for the frame associated with instant $t_0$ and a second color composition for the frame associated with the instant $t_1$. A first data structure and a second data structure can be generated for the first color composition and the second color composition. As described herein, as part of an image check, such data structures can be compared and a determination regarding rendering of the media asset 118 can be made. For instance, a comparison of the color composition at instant t differs from the color composition at instant t'. In FIG. 2B, a white bounding box identifies four example pixels as an illustration of pixels having different colors in such color compositions. In addition, in certain embodiments, another image check can be implemented whereby a third color composition and a fourth color composition can be generated at instants $t_2$ and $t_3$, respectively—see, e.g., FIG. 2A. The monitoring unit 128 can compare the third and fourth color compositions and can determine quality of rendering at instants near the termination (e.g., $t_f$ in the streaming video segment 210).

In addition or in the alternative to performance of image checks, one or more audio checks or samplings can be performed as part of the automated quality control of the disclosure. For media assets that convey images and audio, an audio check can be performed before, after, or during or substantially concurrent with an image check. In one implementation, an audio check can comprise assessment of an audio signal conveyed in a frame of the media asset 118. Based at least on the assessment, the monitoring unit 128 can determine if the audio signal is above a threshold. In certain implementations, the first threshold can be a specific, finite decibel (dB) level. In other implementations, the threshold can be null and, therefore, the monitoring unit 128 can determine if sound is being output by reproduction of the media asset 118 irrespective of the specific level of sound output. In response to the first audio signal being below or substantially at the threshold, the monitoring unit 128 can issue an indication of an audio error.

In scenarios in which the media asset 118 presents adequate rendering according to successful outcomes of at least one image check and audio check, the monitoring unit 128 can classify the media asset 118 as acceptable for consumption. For example, in view of successful automated quality control described herein, the media asset 118 can be accepted for distribution to or consumption in an end-user device, such as a set-top box, a personal computer, a mobile computer, a wearable device, or the like. In addition or in the alternative, the monitoring unit 128 can issue an acceptance notification and retain the same in the one or more test record(s) 136.

Figure 3:
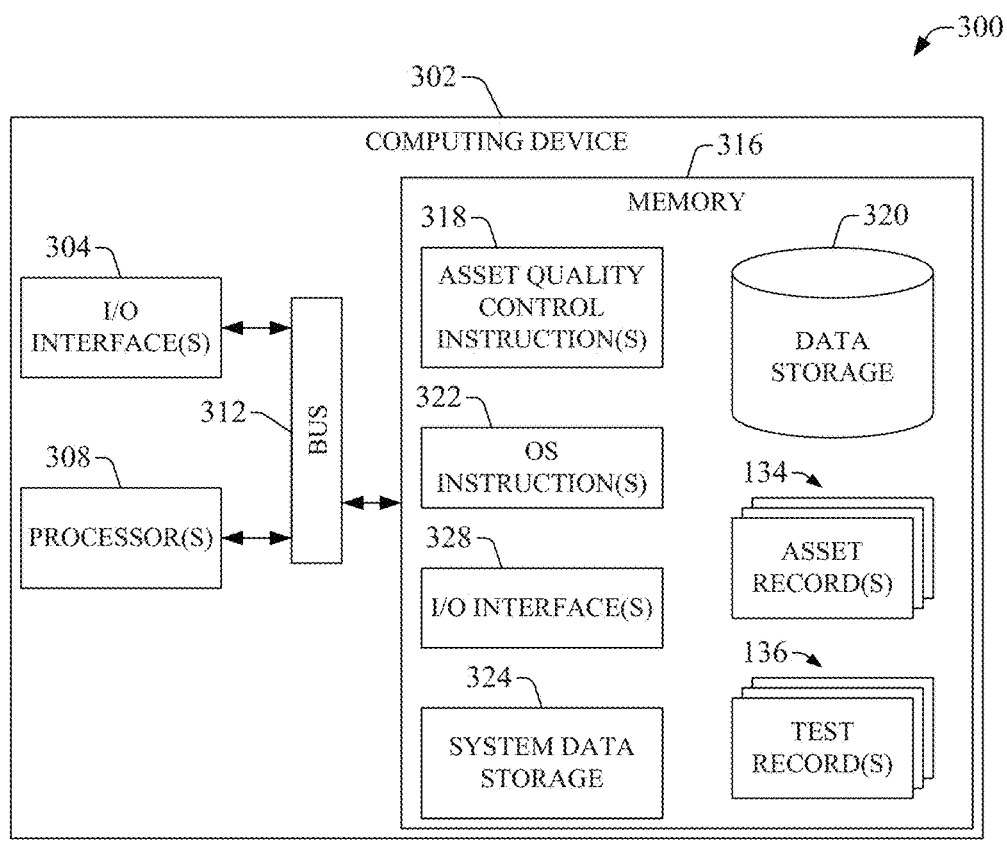
FIG. 3 illustrate an example embodiment of a monitoring unit in accordance with one or more aspects described herein.

FIG. 3 is a high-level block diagram of an exemplary embodiment 300 of a computing device 302 in accordance with one or more aspects of the disclosure. In certain implementations, the computing device 302 can embody the monitoring unit 128. As illustrated, the computing device 302 comprises a group of one or more I/O interfaces 304, a group of one or more processors 308, a memory 316, and a bus 312 that functionally couples (e.g., communicatively couples) two or more of the functional elements of the monitoring unit 128 including the group of one or more processors 308 to the memory 316. In certain scenarios, the group of one or more processors 308 can comprise a plurality of processors that can exploit concurrent computing.

Functionality of the computing device 302 can be configured by a group of computer-executable instructions (e.g., programming code instructions or programming modules) that can be executed by at least one processor of the one or more processors 308. Generally, programming modules can comprise computer code, routines, objects, components, data structures (e.g., metadata objects, data object, control objects), and so forth, that can be configured (e.g., coded or programmed) to perform a particular action or implement particular abstract data types in response to execution by the at least one processor. For example, a group of computer-executable instructions can configure logic that, in response to execution by the at least one processor, can enable the computing device 302 to operate as the monitoring unit 128 in accordance with aspects described herein.

Data and computer-accessible instructions, e.g., computer-readable instructions and computer-executable instructions, associated with specific functionality of the monitoring unit 128 can be retained in memory 316. As illustrated, asset record(s) 134 and test record(s) 136 can be retained in memory 316, and information contained in data storage 138 in example system 100 can be retained in data storage 320 within memory 316. Such data and instructions can permit implementation, at least in part, of the automated quality control of media assets (e.g., media asset 118) in accordance with one or more aspects of the disclosure. In one aspect, the computer-accessible instructions can embody any number of programming code instructions or program modules that permit specific functionality. In the subject specification and annexed drawings, memory elements are illustrated as discrete blocks, however, such memory elements and related computer-accessible instructions (e.g., computer-readable and computer-executable instructions), and data can reside at various times in different storage elements (registers, memory pages, files, databases, memory addresses, etc.; not shown) in memory 316.

Data storage 320 can comprise a variety of data, metadata, or both, associated with the automated quality control of media assets, in accordance with aspects described herein.

Memory 316 also can comprise one or more computer-executable instruction(s) for implementation of specific functionality of the monitoring unit 128 in connection with the automated quality control of streaming media and/or non-streaming media assets described herein. Such computer-executable instructions can comprise asset quality control instruction(s) 318. In one aspect, as described herein, the asset quality control instruction(s) 318 can be stored as an implementation (e.g., a compiled instance) of one or more computer-executable instructions that implement and thus provide at least the functionality of the methods described herein. The asset quality control instruction(s) 318 also can be transmitted across some form of computer readable media. It should be appreciated that different asset quality control instruction(s) 318 can render structurally alike computing devices into functionally different components (e.g., different monitoring units), with functional differences dictated by logic (e.g., computer-executable instructions and data structures) specific to each one of such computing devices and defined by the asset quality control instruction(s) 318.

Memory 316 can be embodied in a variety of computer-readable media. Exemplary computer-readable media can be any available media that is accessible by a processor in a computing device, such as one processor of the group of one or more processors 308, and comprises, for example, both volatile and non-volatile media, removable and non-removable media. As an example, computer-readable media can comprise "computer storage media," or "computer-readable storage media," and "communications media." Such storage media can be non-transitory storage media. "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be utilized to store the desired information and which can be accessed by a computer or a processor therein or functionally coupled thereto.

Memory 316 can comprise computer-readable non-transitory storage media in the form of volatile memory, such as random access memory (RAM), electrically erasable programmable read-only memory (EEPROM), and the like, or non-volatile memory such as read only memory (ROM). In one aspect, memory 316 can be partitioned into a system memory (not shown) that can contain data and/or programming modules that enable essential operation and control of the monitoring unit 128. Such program modules can be implemented (e.g., compiled and stored) in memory element 322, referred to as operating system (OS) instruction(s) 322, whereas such data can be system data that is retained in memory element 324, referred to as system data storage 324. The OS instruction(s) 322 and system data storage 324 can be immediately accessible to and/or are presently operated on by at least one processor of the group of one or more processors 308. The OS instruction(s) 322 can embody an operating system for the computing device. Specific implementation of such OS can depend in part on structural complexity of the computing device 302 (e.g., in certain embodiments, complexity of the monitoring unit 128). Higher structural complexity can afford higher-level OSs. Example operating systems can include Unix, Linux, iOS, Microsoft Windows® operating system, and substantially any operating system for a computing device. In certain scenarios in which the computing device 302 embodies the monitoring unit 128, the operating system embodied in OS instruction(s) 322 can have different levels of complexity based on particular configuration of the monitoring unit 128.

Memory 316 can comprise other removable/non-removable, volatile/non-volatile computer-readable non-transitory storage media. As an example, memory 316 can include a mass storage unit (not shown) which can provide non-volatile storage of computer code, computer readable instructions, data structures, program modules, and other data for the computing device 302. A specific implementation of such mass storage unit (not shown) can depend on desired form factor of the computing device 302 and space available for deployment thereof. For suitable form factors and sizes of the computing device 302, the mass storage unit (not shown) can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), or the like.

Features of automated quality control of a media asset as described herein can be performed, at least in part, in response to execution of software components by a processor. The software components can include one or more implementations of the asset quality control instruction(s) 318—e.g., asset quality control instruction(s) compiled with different compilers). In particular, yet not exclusively, to provide the specific functionality of the computing device 302, a processor of the one or more processors 308 can execute at least a portion of the computer-accessible instructions in asset quality control instruction(s) 318. In certain embodiments, the memory 316 can have computer-executable instructions encoded thereon, such instructions embodying or comprising an implementation of the asset quality control instruction(s) 318. In addition, one of the processors of the one or more processors 308 can be configured, by the computer-executable instructions, to perform an access check for the media asset in accordance with one or more aspects described herein. In addition or in the alternative, the computer-executable instructions can configure such processor to perform, for the media asset, an image check and an audio check in response to the access check being valid. Moreover or as another alternative, the computer-executable instructions can configure the processor to determine if quality testing of the media asset is complete and, in response to the quality testing being determined to be complete, to classify the media asset as accepted for consumption.

In one implementation, the processor of the one or more processor(s) 308, can be further configured, by the computer-executable instructions, to perform an additional image check for the media asset in response to the quality testing being determined to be incomplete. In such implementation or in an alternative implementation, such processor can be further configured, by the computer-executable instructions, to perform an additional audio check for the media asset in response to the additional image check being valid. The processor can be further configured, by the computer-executable instructions, to make another determination if quality testing of the media asset is complete.

In general, a processor of the group of one or more processors 308 can refer to any computing processing unit or processing device comprising a single-core processor, a single-core processor with software multithread execution capability, multi-core processors, multi-core processors with software multithread execution capability, multi-core processors with hardware multithread technology, parallel platforms, and parallel platforms with distributed shared memory (e.g., a cache). In addition or in the alternative, a processor of the group of one or more processors 308 can refer to an integrated circuit with dedicated functionality, such as an application specific integrated circuit (ASIC), a digital signal processor (DSP), a field programmable gate array (FPGA), a complex programmable logic device (CPLD), a discrete gate or transistor logic, discrete hardware components, or any combination thereof designed to perform the functions described herein. In one aspect, processors referred to herein can exploit nano-scale architectures such as, molecular and quantum-dot based transistors, switches and gates, in order to optimize space usage (e.g., improve form factor) or enhance performance of the computing devices that can implement the various aspects of the disclosure. In another aspect, the one or more processors 308 can be implemented as a combination of computing processing units.

The one or more input/output (I/O) interfaces 304 can functionally couple (e.g., communicatively couple) the monitoring unit 128 to another functional element (component, unit, server, gateway node, repository, etc.), for example. Functionality of the monitoring unit 128 that is associated with data I/O or signaling I/O can be accomplished in response to execution, by a processor of the group of one or more processors 308, of at least one I/O interface retained in memory element 328. Such memory element is represented by the block I/O interface(s) 328. In some embodiments, the at least one I/O interface embodies an API that permits exchange of data or signaling, or both, via an I/O interface of I/O interface(s) 304. In certain embodiments, the one or more I/O interfaces 304 can include at least one port that can permit connection of the monitoring unit 128 to other functional elements of the example system 100. In one or more scenarios, the at least one port can comprise network adaptor(s) such as those present in reference links, and other network nodes. In other scenarios, the at least one port can include one or more of a parallel port (e.g., GPIB, IEEE-1284), a serial port (e.g., RS-232, universal serial bus (USB), FireWire or IEEE-1394), an Ethernet port, a V.35 port, or the like. The at least one I/O interface of the one or more I/O interfaces 304 can enable delivery of output (e.g., output data, output signaling) to such functional elements. Such output can represent an outcome or a specific action of one or more actions described herein, such as the actions in one or more of the methods illustrated in FIGS. 4 through 6A-6B.

In certain embodiments, the monitoring unit 128 can comprise a functionality specific platform (not shown) which can include one or more components that permit functionality of the computing device 302. In an embodiment in which the computing device 302 embodies the monitoring unit 128, a component of the one or more components can be a firmware component having dedicated resources (e.g., a processor, software, etc.) to implement certain functions that support implementation of or implement at least part of the functionality of the monitoring unit 128. In another embodiment, the functionality specific platform can include at least a portion of the one or more processors 308 which can be dedicated to execution of a part or all of the asset quality control instruction(s) 318, thus relieving at least some of the computational load from the one or more processors 308 for other operation of the computing device 302.

Bus 312, and the various configurations thereof, represents one or more of several types of bus structures, including a memory bus or memory controller, a peripheral bus, an accelerated graphics port, and a processor or local bus using any of a variety of bus architectures. As an example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB), and the like.

In view of the various aspects of automated quality control of media assets (linear programming assets or recorded media assets, including streaming media assets) described herein, example methods that can be implemented in accordance with the disclosure can be better appreciated with reference to the flowcharts in FIGS. 4 through 6A-6B. For simplicity of explanation, the example methods disclosed herein are presented and described as a series of actions (also referred to as steps), pictorially represented with a block. However, it is to be understood and appreciated that implementation, and related advantages, of such methods is not limited by the order of actions, as some actions may occur in different orders and/or concurrently with other actions from that shown and described herein. For example, the various methods (also referred to as processes) of the disclosure can be alternatively represented as a series of interrelated states or events, such as in a state diagram. Moreover, when disparate functional elements (network nodes, units, etc.) implement different portions of the methods of the disclosure, an interaction diagram or a call flow can represent such methods or processes. Furthermore, not all illustrated actions may be required to implement a method in accordance with the subject disclosure.

The method(s) disclosed throughout the subject specification and annexed drawings can be retained, or stored, on an article of manufacture, or computer-readable non-transitory storage medium, to facilitate transporting and transferring such methods to computing devices (e.g., desktop computers, mobile computers, wearable computers, mobile telephones, and the like) for execution, and thus implementation, by a processor or for storage in a memory.

Figure 4:
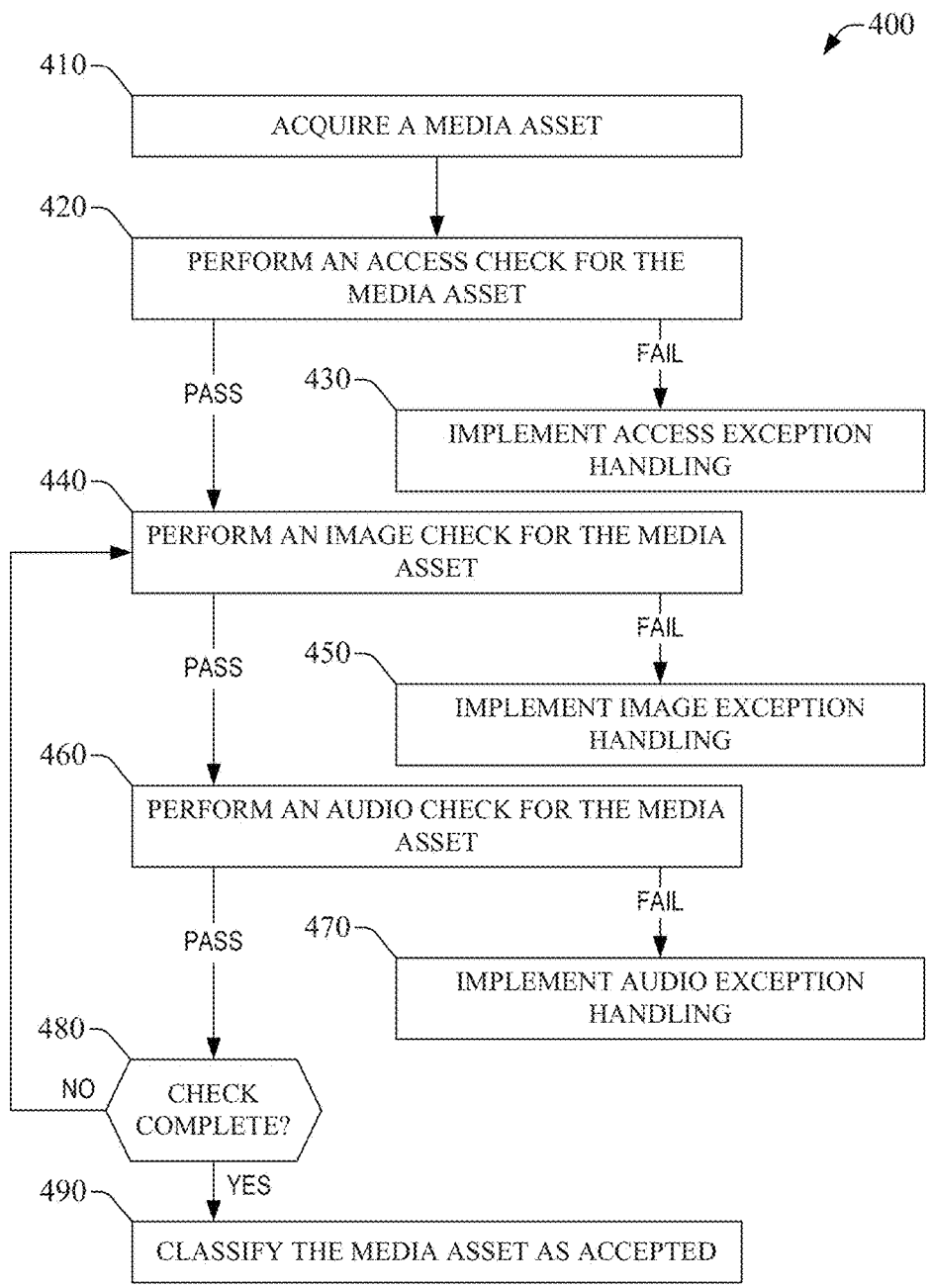

FIG. 4 is a flowchart of an exemplary method 400 for validating an item of content, such as a media asset, in accordance with one or more aspects of the disclosure. In one aspect, the media asset comprises a motion picture and audio, and can be or can comprise a streaming video segment. One or more blocks of the exemplary method 400 can be implemented (e.g., performed or executed) by a computing device (such as the computing device 302), or a processor therein or functionally coupled thereto. At block 410, a media asset is accessed or acquired. Such block can be referred to as an acquiring action and, in one aspect, can comprise querying a repository (e.g., repository 110) for the media asset and, in response, obtaining content and/or metadata associated with the media asset. The metadata can comprise a URL for the media asset. In one implementation, the repository can contain unaccepted media assets, such as streaming video segments not approved for consumption. At block 420, an access check is performed for the media asset. In one aspect, the access check can be performed to determine if the media asset can be configured for consumption in a rendering unit, such as a media player software application executing in a computing device.

In response to failure ("Fail" flow) of the access check, access exception handling can be implemented at block 430. Yet, in response to success ("Pass" flow) of the access check, an image check can be performed at block 440. In one aspect, the image check can be performed to determine if an image contained in the media asset can be rendered. In response to failure of the image check ("Fail" flow), image exception handling is implemented at 450. In response to success of the image check ("Pass" flow), an audio check is performed at block 460.

As illustrated, in response to failure of the audio check, an audio exception is implemented at block 470. In the alternative, in response to success of the audio check, at block 480, it is determined if checking the media asset is complete. In the affirmative case, the media asset can be classified as accepted at block 490. Yet, if the media asset check is not complete, flow is directed to block 440 in which the pixel check is reiterated and, based on outcome of the reiterated check, either another audio check is performed at block 440 or another audio exception is implemented at block 450.

It should be appreciated that in additional or alternative embodiments, the order of implementation of the image check (block 440) and the audio check (block 460) can be performed in alternate order from that illustrated in the exemplary method 400.

Figure 5:
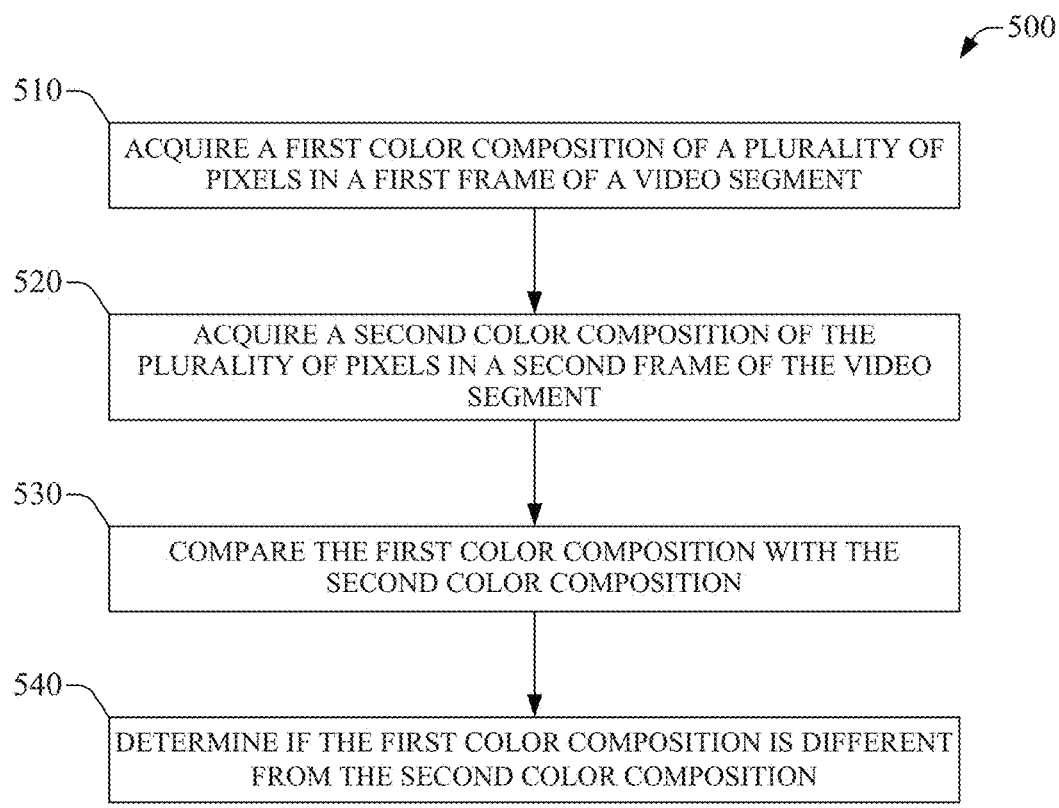

FIG. 5 is a flowchart of an exemplary method 500 for performing a content check, such as an image check for video segments (e.g., streaming video spanning a specific time interval), in accordance with one or more aspects of the disclosure. In one aspect, such exemplary method 500 can embody block 440 in scenarios in which the media asset is a video segment. Accordingly, the exemplary method 500 can be implemented (e.g., configured, executed, configured and executed, etc.) the same functional element (e.g., computing device) that can implement (e.g., execute) one or more blocks of the exemplary method 400. At block 510, a first color composition of a plurality of pixels (or data indicative thereof) in a first frame is acquired. In one aspect, the first color composition is specific to a first instant in the streaming of a video segment (e.g., instant $t_0$ in FIG. 2A). As described herein, the plurality of pixels can be arranged in a grid of $N_x \times N_y$ pixels (such as the 17×17 grid depicted in FIG. 2B or other grids, such as a 30×30 grid) and the first color composition can comprise a first plurality of color values (real number, integer numbers, hexadecimal values, etc.) corresponding to a set of one or more color values, such as RGB values, or C and Y values. The first plurality of values can be retained in a first data structure, such as an multi-dimensional array, that can permit processing of the first color composition. As an illustration, for $N_x=N_y=4$ and in an RGB color representation, the first color composition can comprise or be represented by a 12-tuple or vector, such as (1,2,3,1,2,3,1,2,3,1,2,3) indicating RGB color values of 1, 2, and 3 for each of the four pixels.

In additional or alternative embodiments, instead of acquiring the first color composition, the first color composition is generated. In one aspect, generating the first color composition can comprise applying a function (e.g., a Microsoft Windows® operating system API function, such as the Microsoft Windows graphics device interface (GDI)) to produce a hexadecimal color value for each pixel in the plurality of pixels, and generating (e.g., computing) R component, G component, and B component values for each pixel based on the hexadecimal color value. As an illustration, in one implementation, the getpixel function of the Microsoft Windows GDI library of functions is applied to the first frame and, as a result, a hexadecimal RGB color value of the coordinates of a pixel is obtained. It should be appreciated that in such implementation, the display unit 126 supports the getpixel function. The hexadecimal RGB color value of the pixel can represent, for example, an integer from 0 to 65,535. Such integer can be indicated as $h_p$, and an R component value (r), a G component value (g), and a B component value (b) can be generated according to the following computations: $r=h_p \bmod(256)$; $b=\mathrm{Int}(h_p/65536)$; and $g=(h_p-(b\cdot 65536)-r)/256$. It should be appreciated that the foregoing computations are performed in integer arithmetic and provide r, g, and b that are integers between 0 and 255, representing the shading levels of red, green, and blue. Here, Mod (x) represents the modulo x function and Int(•) is the function that yields the integer part of the argument.

At block 520, a second color composition of the plurality of pixels (or data indicative thereof) in a second frame of the video segment is acquired. The second color composition, in one aspect, can be specific to a second instant (e.g., instant $t_1$ in FIG. 2A) in the streaming of the video segment (e.g., instant $t_1$ in FIG. 2A) that is subsequent to the first instant. The second color composition can comprise a second plurality of values corresponding to a set of one or more values, such as RGB values or C and Y values, representing a color for each pixel of the plurality of pixels for the second frame. The second plurality of values can be retained in a second data structure, such as an multi-dimensional array, that can permit processing of the second color composition. Further to the foregoing illustration, the second color composition can comprise or be represented by a 12-tuple or vector, such as (1,2,3,1,2,3,1,2,3,1,2,3) indicating RGB values of 1, 2, and 3 for each of the four pixels, or (1,2,3,1,2,3,1,2,3,4,4,4) indicating RGB values of 1, 2, and 3 for three pixels and values of 4, 4, and 4 for the remaining pixel.

As described herein, in additional or alternative embodiments, instead of acquiring the second color composition, the second color composition is generated. In one aspect, as described herein, generating the second color composition can comprise applying a function to produce a hexadecimal color value for each pixel in the plurality of pixels, and R component, G component, and B component values for each pixel based on the hexadecimal color value.

At block 530, the first color composition is compared to the second color composition and, at block 540, it is determined if the first color composition is different from the second color composition. In one aspect, such comparison can be accomplished by comparing the first data structure representative of the first color composition with the second data structure representative of the second color composition. For example, in a scenario in which the first color composition and the second color composition are represented, respectively, by the vectors (1,2,3,1,2,3,1,2,3,1,2,3) and (1,2,3,1,2,3,1,2,3,1,2,3), comparison of such vectors indicates the first and second color compositions are the same. Yet, for another example, in a scenario in which the first color composition and the second color composition are represented, respectively, by the vectors (1,2,3,1,2,3,1,2,3,1,2,3) and (1,2,3,1,2,3,1,2,3,4,4,4), comparison of such vectors indicates the first and second color compositions are different.

Figure 6A:
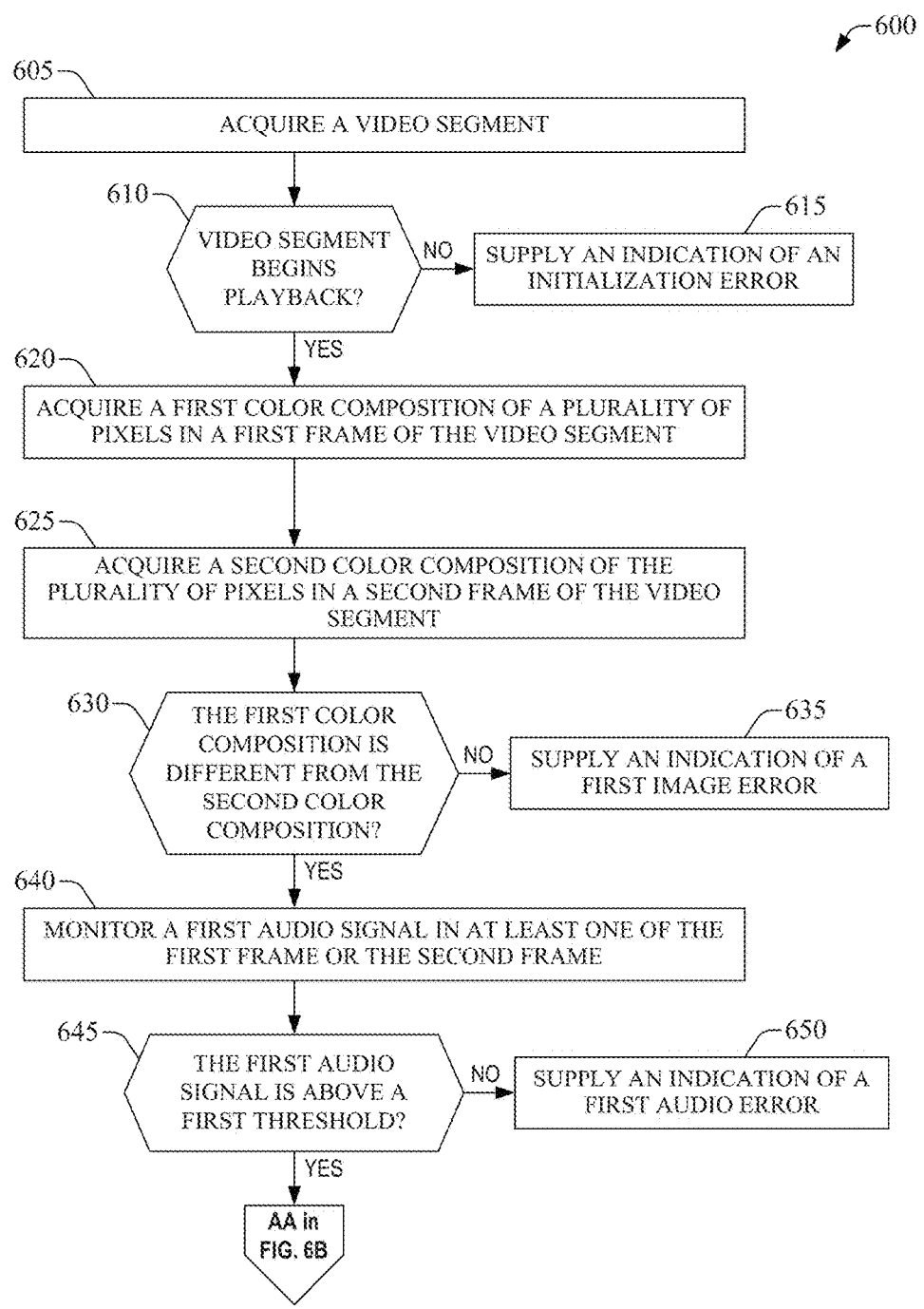
Figure 6B:
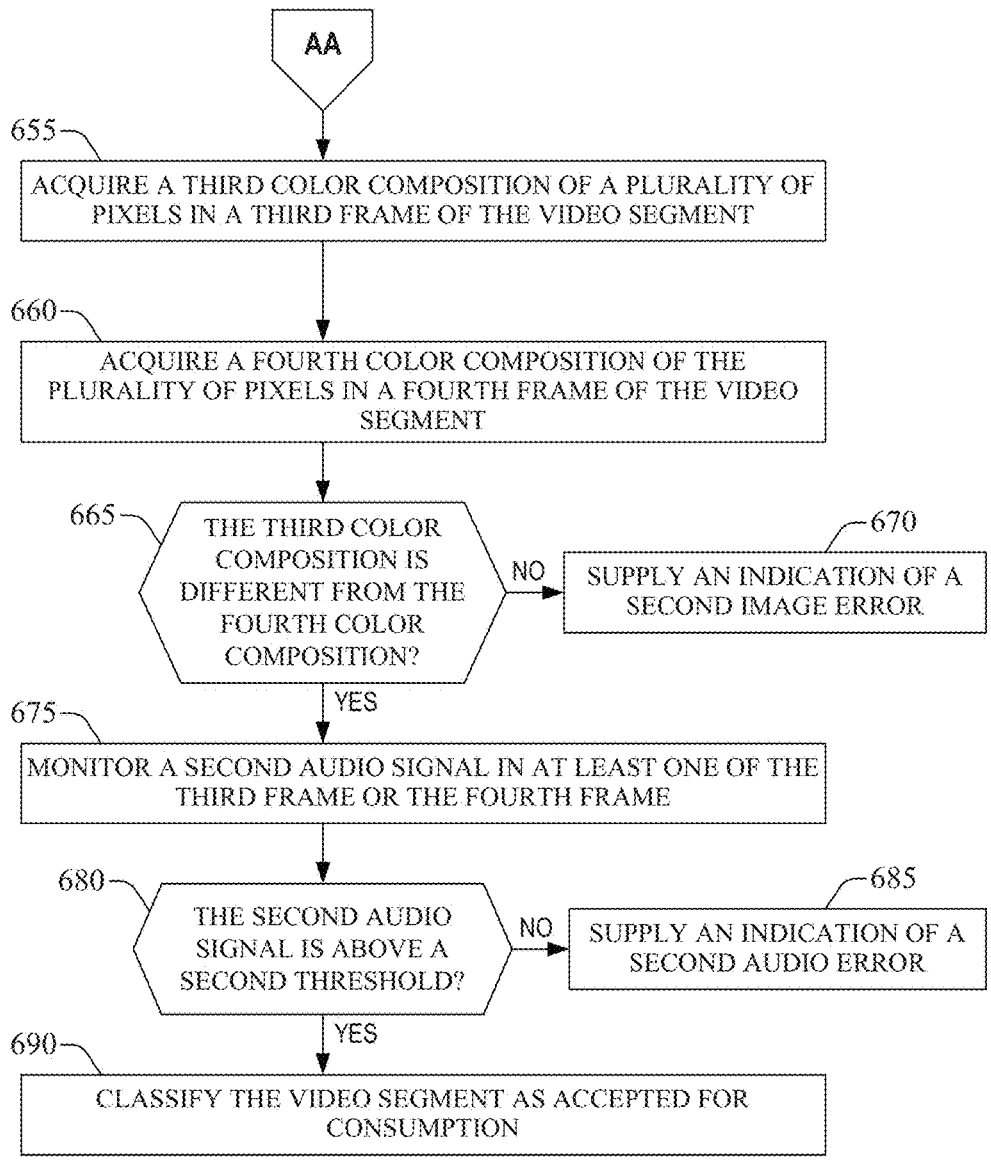

FIGS. 6A-6B illustrate a flowchart of an example method 600 for testing an item of content, such as a media asset, in accordance with one or more aspects described herein, in an embodiment in which the media asset is a video segment. The example method 600 can be implemented (e.g., performed or executed) by a computing device (such as the computing device 302), or a processor therein or functionally coupled thereto. At block 605, the video segment is accessed or acquired. As described herein, the video segment can be acquired from a repository of unapproved (or unaccepted) video segments. In such scenario, the computing device that can perform the example method 600 can query the repository and, in response, receive metadata and/or content associated with the video segment. It should be appreciated that while illustrated with a video segment, the exemplary method 600 can be applied to any item of digital content having visual and aural information.

At block 610, it is determined if the video segment begins playback. In the negative case, an indication of an initialization error is supplied at block 615. In the alternative, when the video segment does begin playback, a first color composition of a plurality of pixels in a first frame (e.g., frame 250 at an instant t) of the video segment is acquired at block 620. In addition or in the alternative, at block 625, a second color composition of the plurality of pixels in a second frame (e.g., frame 255 at an instant t') of the video segment is acquired at block 625. Availability of such color compositions permits determining, at block 630, if the first color composition is different from the second color composition. Collectively, blocks 620 through 630 can embody or can comprise a first image check for the video segment (e.g., streaming video spanning a specific time interval). It should be appreciated that such check is a differential image check, providing an outcome based on a variation of pixel value(s).

In a scenario in which the first color composition is determined to be the same or substantially the same from the second color composition, an indication of a first image error is supplied at block 635. It should be appreciated that such error is supplied because, in one aspect, observing the first color composition to be the same or nearly the same as the second color composition can reveal that the video segment remains unchanged for two different frames, thus conveying that the video segment may have "frozen", or may no longer be rendering different images at different frames. In the alternative, flow is directed to block 640 at which a first audio signal in at least one of the first frame or the second frame is monitored. Block 640 can be referred to as an audio monitoring action. Based on the audio monitoring action, at block 645, it is determined if the first audio signal is above a first threshold. In certain implementations, the first threshold can be a specific, finite decibel (dB) level. In other embodiments, the first threshold can be null and, therefore, at block 645 it is determined if sound is rendered irrespective of the specific level of sound output. In response to the first audio signal being below or substantially at the first threshold, an indication of a first audio error is supplied at block 650, whereas in response to the first audio signal being above the first threshold, flow is directed to block 655 (presented in FIG. 6B), at which a third color composition of a plurality of pixels in a third frame of the video segment is acquired. At block 660, a fourth color composition of the plurality of pixels in a fourth frame of the video segment is acquired. At block 665, it is determined if the third color composition is different from the fourth color composition. Collectively, blocks 655 through 665 can embody or can comprise a second image check for the video segment. It should be appreciated that the second image check also is a differential image check.

When the third color composition is determined to be the same or substantially the same, an indication of a second image error is supplied at block 670. Alternatively, flow is directed to block 675 at which a second audio signal in at least one of the third frame or the fourth frame is monitored. Block 675 can be referred to as an audio monitoring action. Based on the audio monitoring action, at block 680, it is determined if the second audio signal is above a second threshold (e.g., a specific dB level). While in certain implementations the first threshold can be equal to the second threshold, different thresholds can be contemplated. As discussed herein, in scenarios in which the second threshold is finite, and measured in decibels, for example, implementation of block 680 can determine if a specific level of sound is detected in the audio monitoring. In a scenario in which a second threshold is null, implementation of block 680 can determine if sound is present (e.g., sound is rendered) irrespective of the specific level of sound output when the video segment is played. In response to the second audio signal being below or substantially at the second threshold, an indication of a second audio error is supplied at block 685. Yet, in response to the second audio signal being above the second threshold, flow is directed to block 690, at which the video segment is classified, or otherwise characterized, as accepted for consumption. In one aspect, acceptance for consumption can indicate that the video segment is suitable for distribution to end-users in a service network (e.g., a cable network; which can be embodied by the network 160). Block 690 can be referred to as a classifying action and, in one aspect, can comprise supplying data indicative of the video segment being valid for consumption.

In view of the subject specification and annexed drawings, when compared with conventional technologies for quality control and/or quality assurance of streaming media, various advantages emerge. For example, the disclosure can provide automated quality control of media assets that can mitigate or avoid quality assurance errors arising from human intervention that generally is part of the conventional technologies. As a result, the disclosure can largely reduce customer attrition of a streaming content platform originating from poor quality of provided media assets. For another example, certain embodiments of the disclosure can be integrated to substantially any repository or service platform containing the same for performing quality control of one or more media assets contained in the repository. For yet another example, other embodiments of the disclosure can be portable and thus can permit ad hoc testing of media assets in local repositories in the field or within customer premises.

In certain embodiment(s), one or more of the disclosed systems, apparatuses, or devices can implement one or more features of the disclosure by applying artificial intelligence (AI) techniques, such as machine learning and iterative learning, to generate an inference. Examples of such techniques include, but are not limited to, expert systems, case based reasoning, Bayesian networks, behavior based AI, neural networks, fuzzy systems, evolutionary computation (e.g., genetic algorithms), swarm intelligence (e.g., ant algorithms), and hybrid intelligent systems (e.g., expert inference rules generated through a neural network or production rules from statistical learning).

While the systems, apparatuses, and methods have been described in connection with exemplary embodiments and specific examples, it is not intended that the scope be limited to the particular embodiments set forth, as the embodiments herein are intended in all respects to be illustrative rather than restrictive.

Unless otherwise expressly stated, it is in no way intended that any protocol, procedure, process, or method set forth herein be construed as requiring that its acts or steps be performed in a specific order. Accordingly, in the subject specification and annexed drawings, where a description of a protocol, procedure, process, or method does not actually recite an order to be followed by its acts or steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification or annexed drawings, or the like.

It will be apparent that various modifications and variations can be made without departing from the scope or spirit of the subject disclosure. Other embodiments will be apparent from consideration of the specification and practice disclosed herein. It is intended that the specification and examples be considered as non-limiting illustrations only, with a true scope and spirit of the subject disclosure being indicated by the following claims.

What is claimed is:

1. A method, comprising:
    generating a first color composition based on a first plurality of pixels of a first frame of a media asset and a second color composition based on a first plurality of pixels of a second frame of the media asset;
    comparing the first color composition to the second color composition;
    in response to the first color composition being the same as the second color composition, generating a third color composition based on a second plurality of pixels of the first frame and a fourth color composition based on a second plurality of pixels of the second frame;
    comparing the third color composition to the fourth color composition;
    in response to the third color composition being the same as the fourth color composition, monitoring an audio signal associated with the media asset;
    determining that the audio signal is indicative of sound output below a threshold; and
    in response to determining that the audio signal is indicative of sound output below the threshold, generating an indication of a playback error.

2. The method of claim 1, wherein coordinates of the first plurality of pixels of the first frame correspond to coordinates of the first plurality of pixels of the second frame, and coordinates of the second plurality of pixels of the first frame correspond to coordinates of the second plurality of pixels of the second frame.

3. The method of claim 2, further comprising:
generating a fifth color composition based on a plurality of pixels of a third frame of the media asset and a sixth color composition based on a plurality of pixels of a fourth frame of the media asset; wherein coordinates of the plurality of pixels of the third frame correspond to coordinates of the plurality of pixels of the fourth frame;
comparing the fifth color composition to the sixth color composition; and
in response to the fifth color composition being the same as the sixth color composition, supplying an indication of another playback error.

4. The method of claim 1, wherein the first plurality of pixels in the first frame and the first plurality of pixels in the second frame both are arranged in a predetermined grid pattern, and at least one of the first color composition or the second color composition is a superposition of a red color (R) component, a green color (G) component, and a blue (B) color component.

5. The method of claim 4, further comprising extracting respective values of the R component, the G component; and the B component for at least a portion of pixels of both the first plurality of pixels in the first frame and the first plurality of pixels in the second frame.

6. The method of claim 1, wherein the second plurality of pixels in the first frame and the second plurality of pixels in the second frame both are arranged in a predetermined grid pattern, and at least one of the third color composition or the fourth color composition is a superposition of a red color (R) component, a green color (G) component, and a blue color (B) component.

7. The method of claim 6, further comprising extracting respective values of the R component, the G component, and the B component for at least a portion of pixels of both the second plurality of pixels in the first frame and the second plurality of pixels in the second frame.

8. The method of claim 6, further comprising:
monitoring another audio signal associated with the plurality of frames of the media asset; and
determining that the another audio signal is indicative of sound output above the threshold.

9. The method of claim 8, further comprising generating data indicative of the media asset being accepted for consumption in response to the third color composition being different from the fourth color composition and the another audio signal being indicative of sound output above the threshold, wherein the sound output above the threshold indicates a presence of sound output.

10. An apparatus, comprising:
one or more processors; and
memory storing processor executable instructions that, when executed by the one or more processors, cause the apparatus to:
generate a first color composition based on a first plurality of pixels of a first frame of a media asset and a second color composition based on a first plurality of pixels of a second frame of the media asset;
compare the first color composition to the second color composition;
in response to the first color composition being the same as the second color composition, generate a third color composition based on a second plurality of pixels of the first frame and a fourth color composition based on a second plurality of pixels of the second frame;
compare the third color composition to the fourth color composition;
in response to the third color composition being the same as from the fourth color composition, monitor an audio signal associated with the media asset;
determine that the audio signal is indicative of sound output below a threshold; and
in response to determining that the audio signal is indicative of sound output below the threshold, generate an indication of a playback error.

11. The apparatus of claim 10, wherein coordinates of the first plurality of pixels of the first frame correspond to coordinates of the first plurality of pixels of the second frame, and coordinates of the second plurality of pixels of the first frame correspond to coordinates of the second plurality of pixels of the second frame.

12. The apparatus of claim 11, wherein the processor executable instructions, when executed by the one or more processors, further cause the apparatus to:
generate a fifth color composition based on a plurality of pixels of a third frame of the media asset and a sixth color composition based on a plurality of pixels of a fourth frame of the media asset, wherein coordinates of the plurality of pixels of the third frame correspond to coordinates of the plurality of pixels of the fourth frame;
compare the fifth color composition to the sixth color composition; and
determine that the fifth color composition is the same as the sixth color composition, and in response, generate an indication of another playback error.

13. The apparatus of claim 11, wherein the first plurality of pixels in the first frame and the first plurality of pixels in the second frame are both arranged in a predetermined grid pattern, and at least one of the first color composition or the second color composition is a superposition of a red color (R) component, a green color (G) component, and a blue color (B) component.

14. The apparatus of claim 13, wherein the processor executable instructions, when executed by the one or more processors, further cause the apparatus to extract respective values of the R component, the G component, and the B component for at least a portion of pixels of both the first plurality of pixels in the first frame and the first plurality of pixels in the second frame.

15. The apparatus of claim 10, wherein the second plurality of pixels in the first frame and the second plurality of pixels in the second frame both are arranged in a predetermined grid pattern, and at least one of the third color composition or the fourth color composition is a superposition of a red color (R) component, a green color (G) component, and a blue (B) color component.

16. The apparatus of claim 15, wherein the processor executable instructions, when executed by the one or more processors, further cause the apparatus to:
monitor another audio signal associated with the media asset; and
determine that the another audio signal is indicative of sound output above the threshold.

17. The apparatus of claim 16, wherein the processor executable instructions, when executed by the one or more processors, further cause the apparatus to generate data indicative of the media asset being accepted for consumption in response to the third color composition being different from the fourth color composition and the another audio signal being indicative of sound output above the threshold, wherein the sound output above the threshold indicates a presence of sound output.

18. One or more non-transitory computer readable media storing processor executable instructions that, when executed by at least one processor cause the at least one processor to:
generate a first color composition based on a first plurality of pixels of a first frame of a media asset and a second color composition based on a first plurality of pixels of a second frame of the media asset;
compare the first color composition to the second color composition,
in response to the first color composition being the same as the second color composition, generate a third color composition based on a second plurality of pixels of the first frame and a fourth color composition based on a second plurality of pixels of the second frame;
compare the third color composition to the fourth color composition;
in response to the third color composition being the same as from the fourth color composition, monitor an audio signal associated with the media asset;
determine that the audio signal is indicative of sound output below a threshold; and
in response to the audio signal being indicative of the sound output below the threshold, generate an indication of a playback error.

19. The one or more non-transitory computer readable media of claim 18, wherein coordinates of the first plurality of pixels of the first frame correspond to coordinates of the first plurality of pixels of the second frame, and coordinates of the second plurality of pixels of the first frame correspond to coordinates of the second plurality of pixels of the second frame.

20. The one or more non-transitory computer readable media of claim 18, wherein the processor executable instructions, when executed by the at least one processor, further cause the at least one processor to:
generate a fifth color composition based on a plurality of pixels of a third frame of the media asset and a sixth color composition based on a plurality of pixels of a fourth frame of the media asset, wherein coordinates of the plurality of pixels of the third frame correspond to coordinates of the plurality of pixels of the fourth frame;
compare the fifth color composition to the sixth color composition;
determine that the fifth color composition is the same as the sixth color composition; and
in response to the fifth color composition being the same as the sixth color composition, generate an indication of another playback error.

* * * * *